US006142487A

United States Patent [19]

Swain

[11] Patent Number: 6,142,487

[45] Date of Patent: Nov. 7, 2000

[54] CENTERING AND HOLDING APPARATUS AND METHOD USING INCLINED SURFACE

[75] Inventor: Eugene A. Swain, Webster, N.Y.

[73] Assignee: Xerox Corporation, Stamford, Conn.

[21] Appl. No.: 09/339,317

[22] Filed: Jun. 23, 1999

[51] Int. Cl.[7] ................................ B23B 31/40; B66C 1/56

[52] U.S. Cl. ......................... 279/133; 279/2.08; 279/2.17; 279/4.03; 118/503; 198/803.12; 198/867.09; 294/93; 294/98.1; 414/746.5

[58] Field of Search .................................... 279/133, 2.08, 279/2.17, 4.03; 294/93–98, 98.1; 198/803.12, 867.09; 414/764.5; 118/503

[56] References Cited

U.S. PATENT DOCUMENTS

| | | | |
|---|---|---|---|
| 1,163,560 | 12/1915 | Schildwachter | 294/93 |
| 1,696,526 | 12/1928 | Crossen | 294/96 |
| 3,227,483 | 1/1966 | Guild et al. | 279/2.09 |
| 4,121,868 | 10/1978 | Pierce et al. | 294/95 |
| 5,328,181 | 7/1994 | Mistrater et al. | 279/2.17 |
| 5,794,948 | 8/1998 | Schmitt et al. | 279/2.17 |
| 5,829,760 | 11/1998 | Mistrater et al. | 279/2.22 |

*Primary Examiner*—Steven C. Bishop
*Attorney, Agent, or Firm*—Zosan S. Soong

[57] ABSTRACT

An apparatus for centering and holding a substrate including: (a) a substrate holding assembly defining a centerline; and (b) a substrate centering assembly including an alignment member, wherein the alignment member is disposed concentric with the centerline and has an inclined surface that is inclined in a direction such that upon sliding contact of the substrate with the inclined surface, the substrate moves toward the centerline.

11 Claims, 8 Drawing Sheets

CENTERING AND HOLDING APPARATUS AND METHOD USING INCLINED SURFACE

FIELD OF THE INVENTION

This invention relates to equipment and a method for centering and holding a substrate for processing.

BACKGROUND OF THE INVENTION

When dip coating small diameter cylindrical substrates, a major problem is the reliable insertion of the chucking device into the open end of the substrate. This is because the substrate must be held vertical but still must be able to be removed from its supporting device (which may be in the form of a pin). This means the supporting device must allow some clearance between the supporting device and the substrate, resulting in the substrate being slightly off-center from the exact vertical position. Over the length of a long substrate, the top end of the substrate could be significantly out of position. When this happens, it becomes difficult to reliably insert the chucking device into the substrate.

There is a need, which the present invention addresses, for a chucking device that can reliably center and hold off-center substrates.

Conventional chucking devices are disclosed in Mistrater et al., U.S. Pat. No. 5,328,181; Mistrater et al., U.S. Pat. No. 5,829,760; and Schmitt et al., U.S. Pat. No. 5,794,948.

SUMMARY OF THE INVENTION

The present invention is accomplished in embodiments by providing an apparatus for centering and holding a substrate comprising:

(a) a substrate holding assembly defining a centerline; and (b) a substrate centering assembly including an alignment member, wherein the alignment member is disposed concentric with the centerline and has an inclined surface that is inclined in a direction such that upon sliding contact of the substrate with the inclined surface, the substrate moves toward the centerline.

There is also provided in embodiments of the apparatus, wherein the substrate is hollow and has an open end, and wherein the substrate holding assembly includes a section having a changeable width, wherein the width of the section is changeable to insert the section into the substrate interior, to contact the section with the substrate interior surface, and to remove the section from the substrate interior.

There is further provided a handling method for a substrate wherein the substrate is off-center from a centered position, comprising:

(a) contacting the substrate with an inclined surface that is inclined towards the centered position and sliding the substrate along the inclined surface until the substrate is in the centered position; and (b) gripping the substrate to hold the substrate.

In embodiments of the method, there may be included:

(c) processing the substrate while gripping the substrate.

BRIEF DESCRIPTION OF THE DRAWINGS

Other aspects of the present invention will become apparent as the following description proceeds and upon reference to the Figures which represent preferred embodiments.

Unless otherwise noted, the same reference numeral in different Figures refers to the same or similar feature.

DETAILED DESCRIPTION

Figure 1:
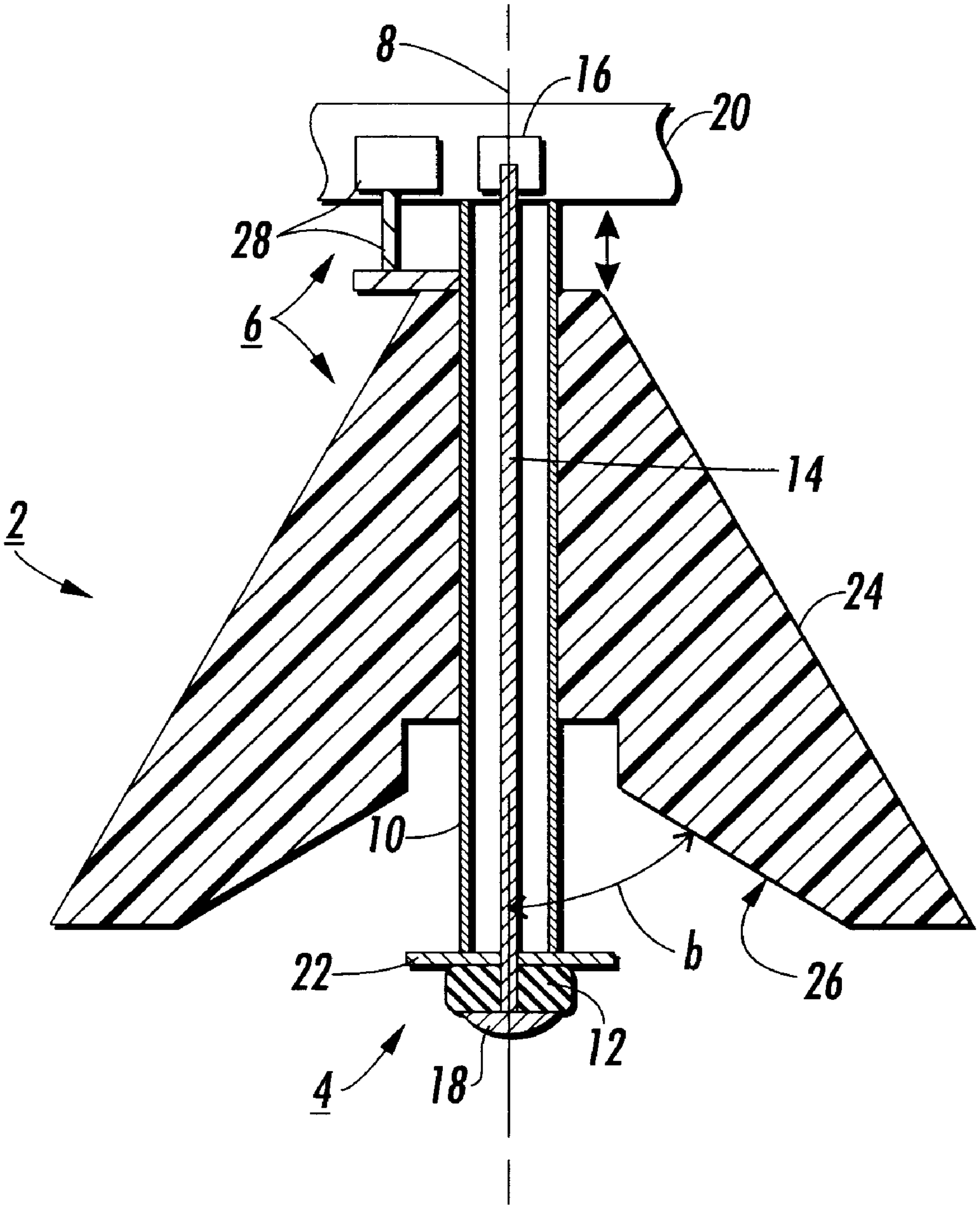
FIG. 1 shows a simplified, elevational, cross-sectional view of one embodiment of the present invention.

In FIG. 1, there is shown a substrate centering and holding apparatus 2 including substrate holding assembly 4 and substrate centering assembly 6.

The substrate holding assembly 4 defines a centerline 8 and preferably includes elongated arm 10, a section 12 having a changeable width, tension shaft 14, tension applying means 16 attached to the upper end of tension shaft, and presser 18 secured to the lower end of tension shaft. The tension applying means 16 and the elongated arm 10 are mounted to a movable pallet 20 which may contain a plurality of the substrate centering and holding apparatuses described herein. A flange 22 may be present to position the substrate end against the substrate holding assembly. Suitable substrate holding assemblies are disclosed in for example Mistrater et al., U.S. Pat. No. 5,328,181 and Mistrater et al., U.S. Pat. No. 5,829,760, the disclosures of which are totally incorporated by reference.

The present centering and holding apparatus may be employed in the dip coat process material handling system described in Pietrzykowski, Jr. et al., U.S. Pat. No. 5,334,246, the disclosure of which is totally incorporated herein by reference.

The section 12 is depicted in the preferred form of an expandable disk, which when compressed will have an increased width. The expandable disk may be fabricated of an elastomeric polymer, especially a high temperature resistant elastomer. Typical elastomers having a durometer of about 25 to about 45 and a maximum continuous use temperature rating of at least about 230 degrees C include, for example, fluoroelastomers, silicone rubbers, fluorosilicone rubbers, ethylene propylene rubber, and the like. Preferred fluoroelastomers are available under the VITON™ tradename. An inflatable air bladder may be used in place of the expandable disk.

Typical tension applying means include, for example, helical springs, solenoids, two way acting air cylinders, screws, levers, notched ramps, cam devices, and the like.

The substrate centering assembly 6 includes an alignment member 24 that is disposed around the elongated arm 10 and concentric with the centerline 8. The alignment member has an inclined surface 26 that is inclined in a direction such that upon sliding contact of the substrate end with the inclined surface, the substrate end moves toward the centerline. The alignment member is shown in the raised position, i.e., not ready to engage the substrate. The substrate centering assembly preferably includes means 28 operatively coupled to the alignment member for moving the alignment member from a raised position to a lowered position, and vice versa. Such means 28 includes for example helical springs, solenoids, two way acting air cylinders, screws, levers, notched ramps, cam devices, and the like. Preferably, the alignment member moving means 28 includes a pneumatic device and a cable. In certain embodiments, however, the alignment member may be immobile and fixed at the lowered position, i.e., ready to engage the end of the substrate.

Figure 2:
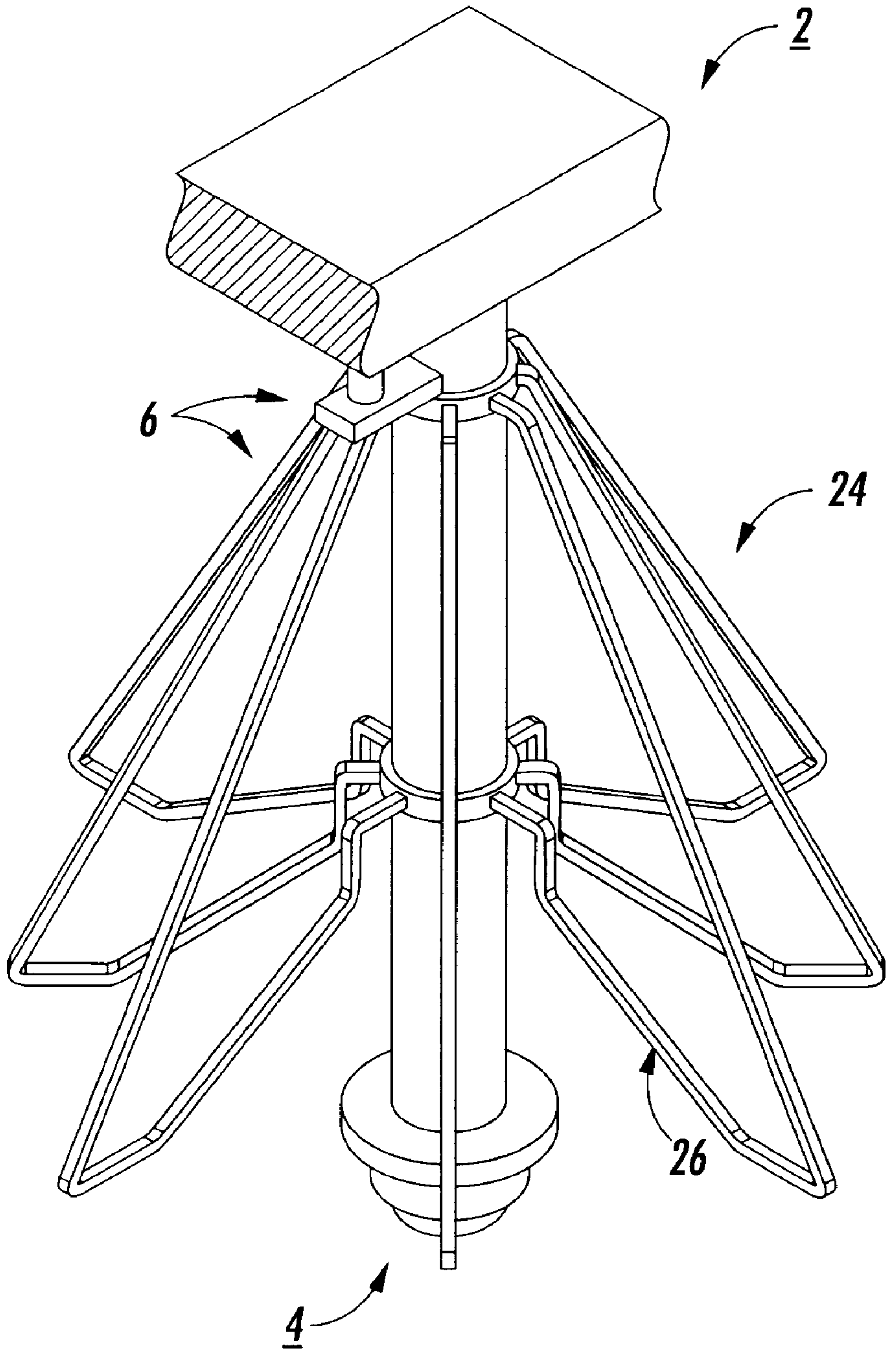
FIG. 2 shows a simplified, perspective view of a second embodiment of the present invention.

The alignment member may have any suitable shape which provides an inclined surface 26 that biases the substrate towards the centerline such as a cone (depicted in FIG. 1) or a plurality of fingers such as two to twenty fingers. FIG. 2 depicts the alignment member 24 as a plurality of fingers. The inclined surface 26 of the alignment member forms an angle b with the centerline 8 ranging for example from about 10 to about 60 degrees, preferably from about 20 to about 40 degrees.

Operation of the present centering and holding apparatus is now described.

Figure 3:
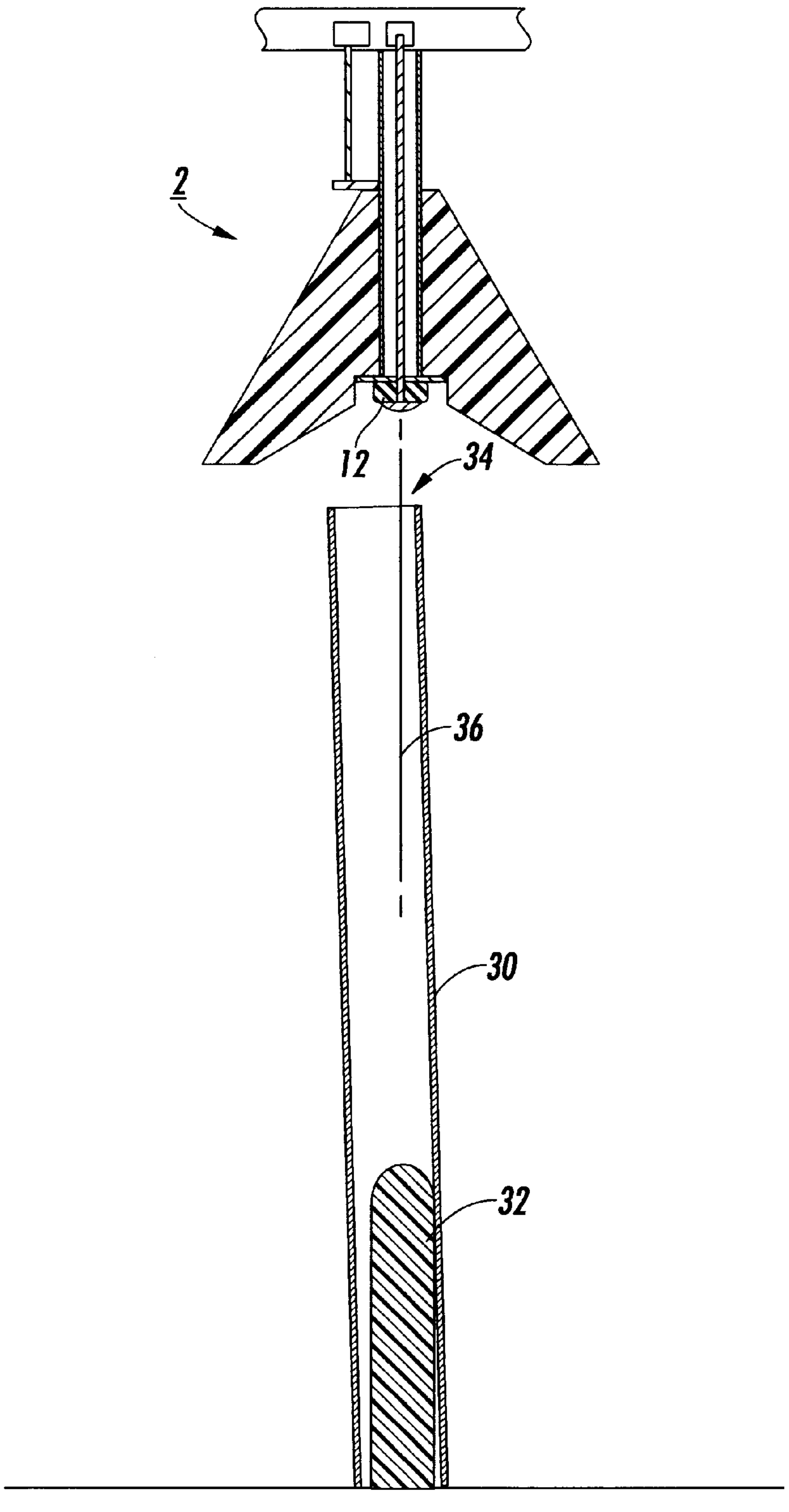
FIG. 3 shows a simplified, elevational, cross-sectional view of the embodiment of FIG. 1 prior to engagement with an off-center substrate.

In FIG. 3, the substrate 30 is shown as a hollow cylinder that is open at both ends. The substrate is positioned on a supporting device 32 in a generally vertical orientation. Since there is some clearance between the substrate and the supporting device, the substrate is slightly off-center from the imaginary vertical line 36 as the substrate rests against the supporting device. Centering and holding apparatus 2 is positioned over the open end 34 of the substrate at about the imaginary vertical line 36. The alignment member of the substrate centering assembly is shown in the lowered position. The section 12 is shown in the uncompressed condition, which has a smaller width than that of the compressed section. The smaller width of the uncompressed section facilitates its insertion into the substrate through the open end.

Figure 4:
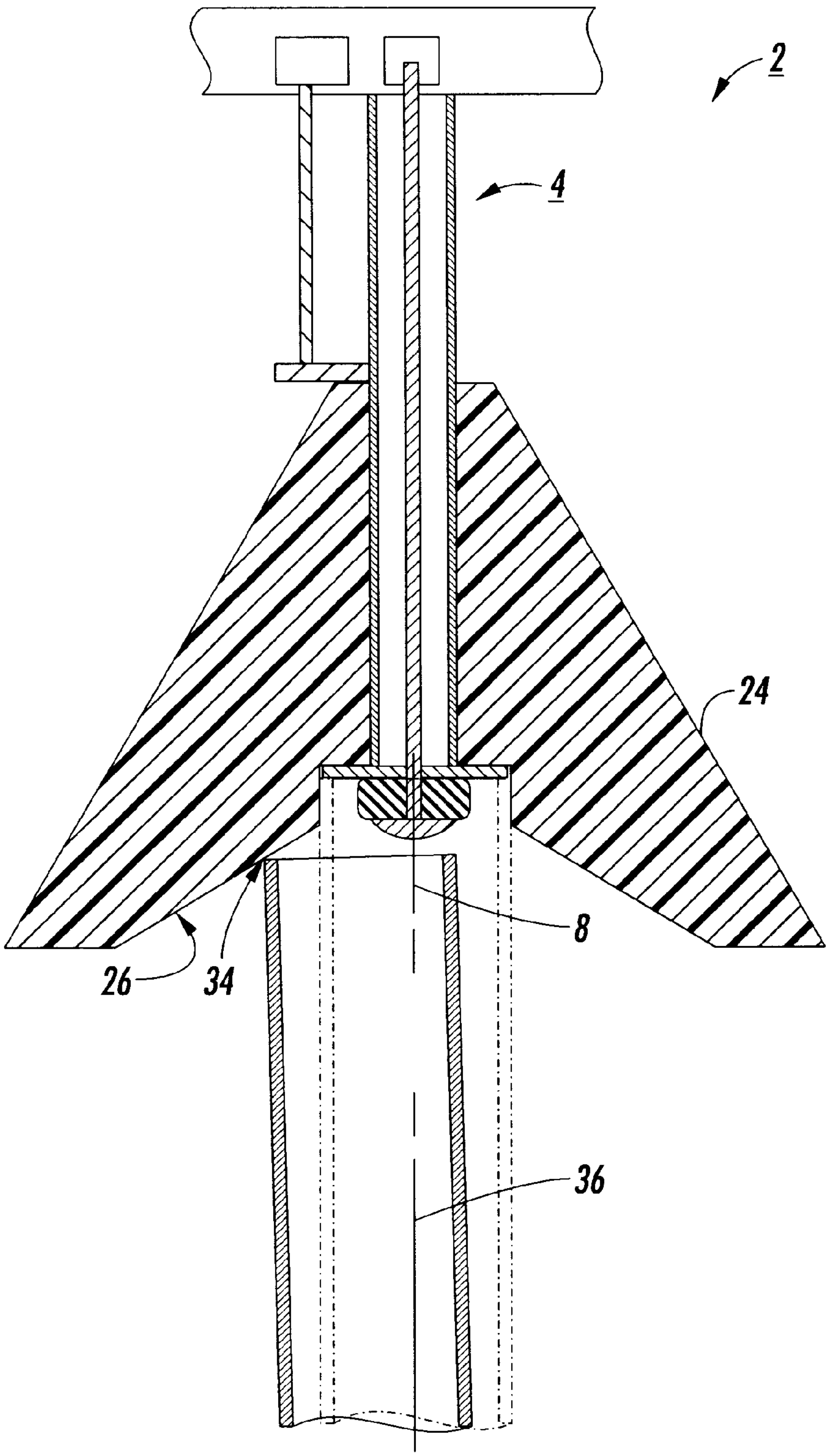
FIG. 4 shows a simplified, elevational, cross-sectional view of the embodiment of FIG. 1 in contact with an off-center substrate.

In FIG. 4, the substrate end 34 engages the alignment member 24 and the substrate end progressively slides along the inclined surface 26 towards the vertical line 36. The vertical line 36 coincides with the centerline 8 of the substrate holding assembly 4. Contact of the substrate and the centering and holding apparatus 2 may be accomplished by moving the substrate, the centering and holding apparatus, or both towards one another.

Figure 5:
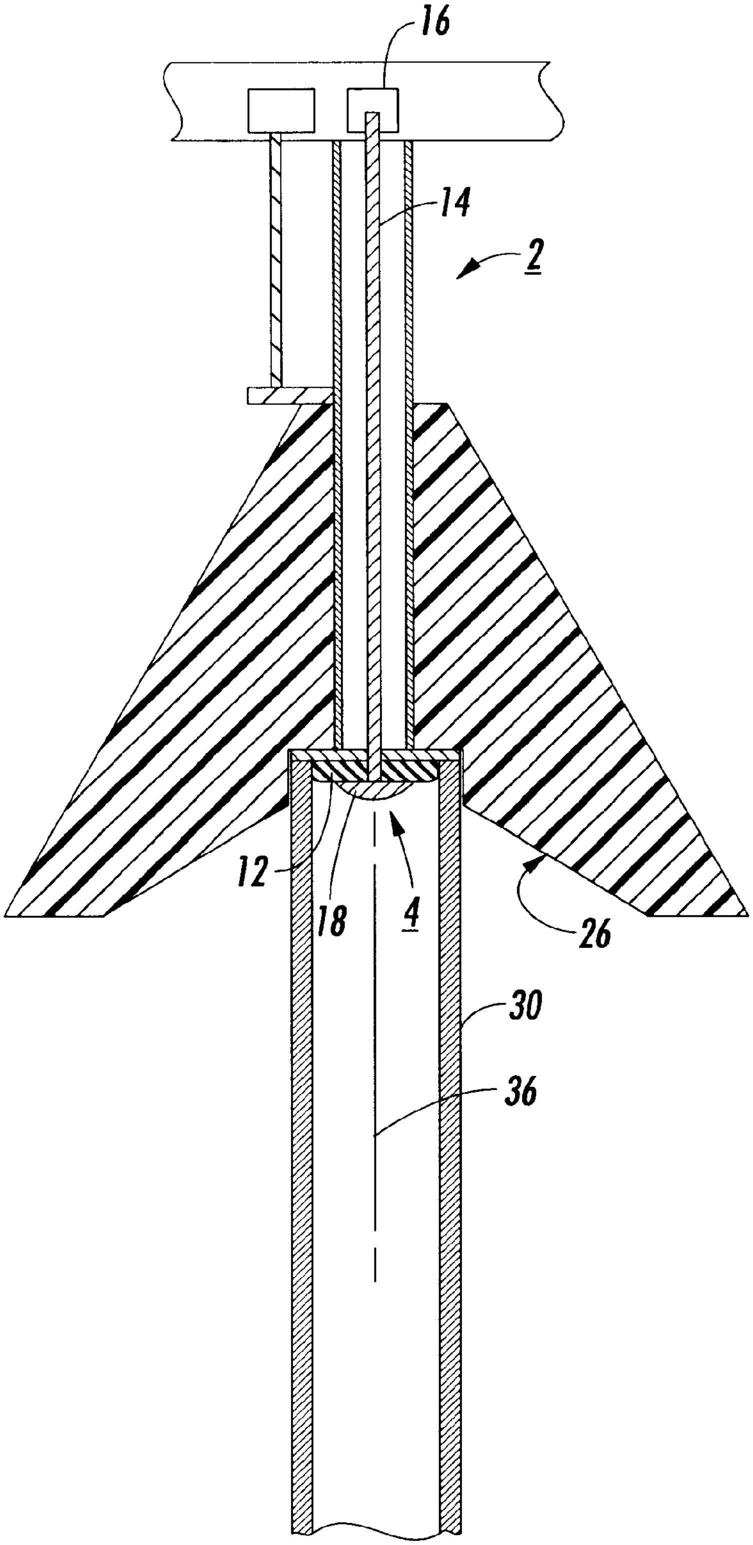
FIG. 5 shows a simplified, elevational, cross-sectional view of the embodiment of FIG. 1 holding a centered substrate where the alignment member is in the lowered position.

FIG. 5 shows the substrate 30 in the centered position after the substrate end is moved along the inclined surface 26 such that the longitudinal axis of the substrate is aligned with the vertical line 36. The uncompressed section is inserted into the substrate. Then the tension applying means 16 is activated which pulls tension shaft 14 and the presser 18 upwards, thereby compressing section 12 and expanding its width. The expanded section contacts the substrate interior surface to preferably create a hermetic seal. The centering and holding apparatus 2 lifts the substrate off the supporting device 32. During processing of the substrate, the substrate is held by the substrate holding assembly 4, preferably in a vertical substrate orientation, via the expanded section 12.

Figure 6:
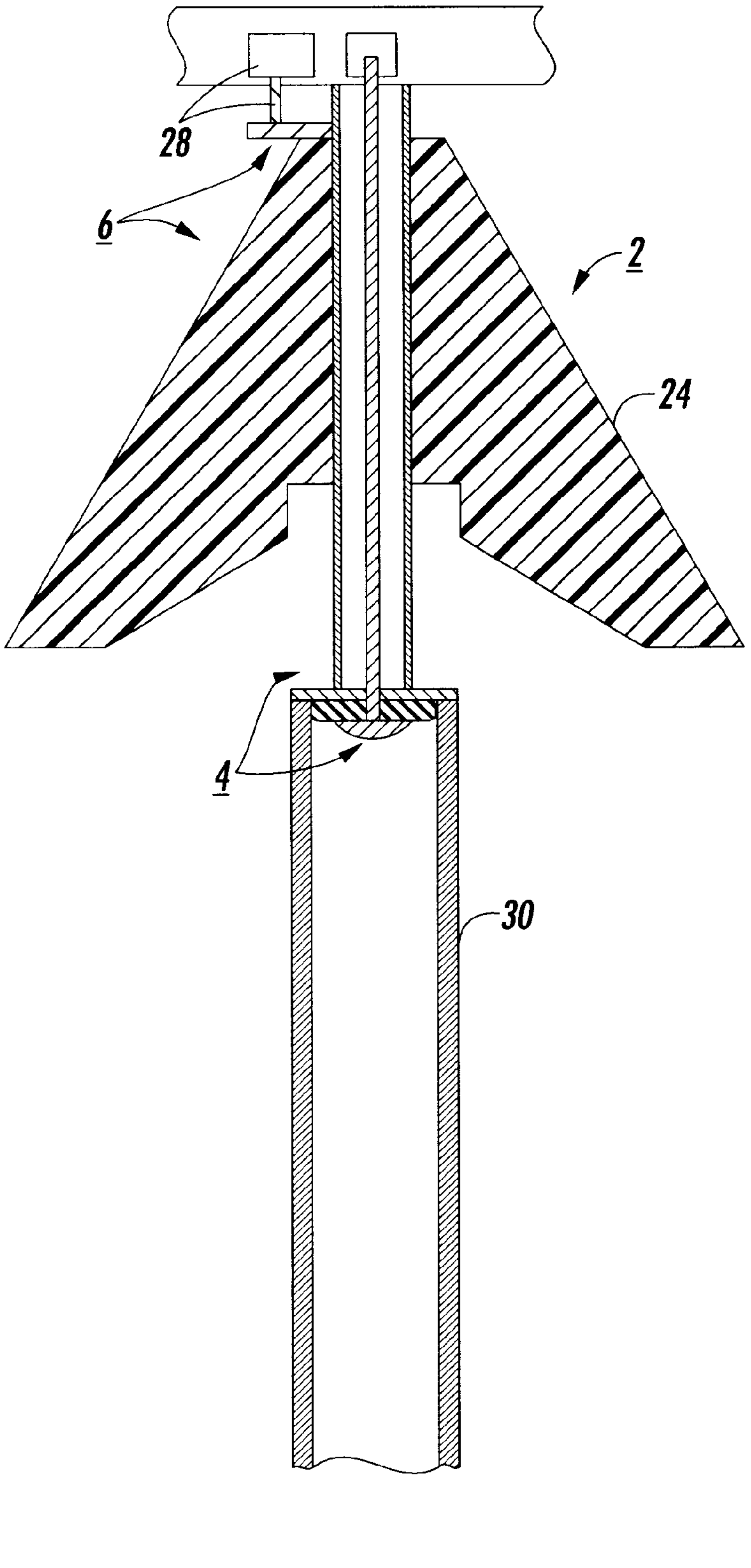
FIG. 6 shows a simplified, elevational, cross-sectional view of the embodiment of FIG. 1 holding a centered substrate where the alignment member is in the raised position.

FIG. 6 shows the alignment member 24 in the raised position, prior to any processing of the substrate 30. The alignment member moving means 28 is activated to raise the alignment member. Raising the alignment member minimizes or prevents for instance undesired coating of the alignment member during processes involving the formation of a layer of a coating composition on the substrate.

After processing of the substrate, the tension applying means is deactivated which removes the compressive force on the section, whereby the width of the section decreases. The smaller width of the section facilitates its removal from the substrate. Prior to engaging another substrate, the alignment member moving means is activated to lower the alignment member.

Figure 7:
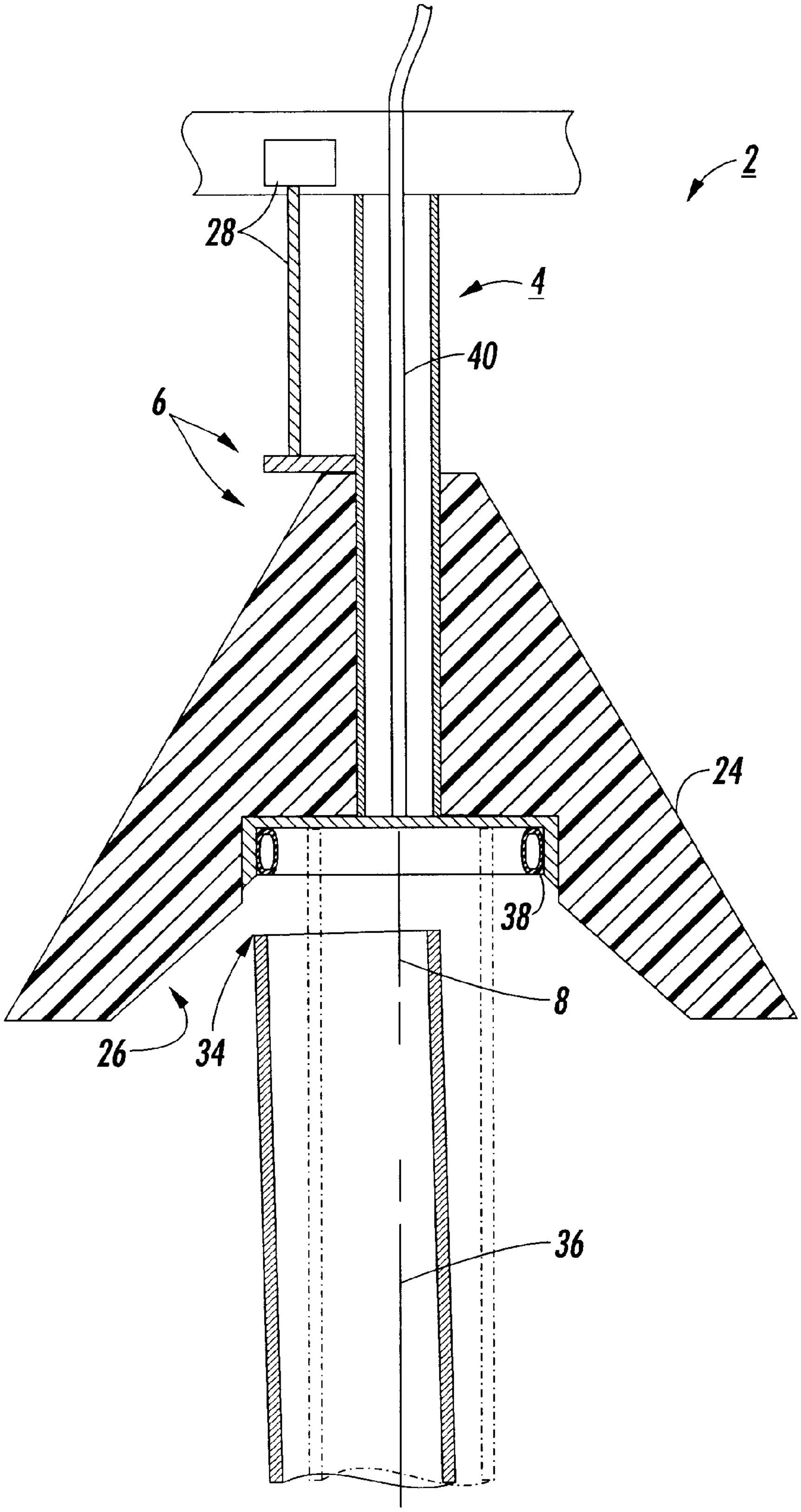
FIG. 7 shows a simplified, elevational, cross-sectional view of a third embodiment of the present invention in contact with an off-center substrate.
Figure 8:
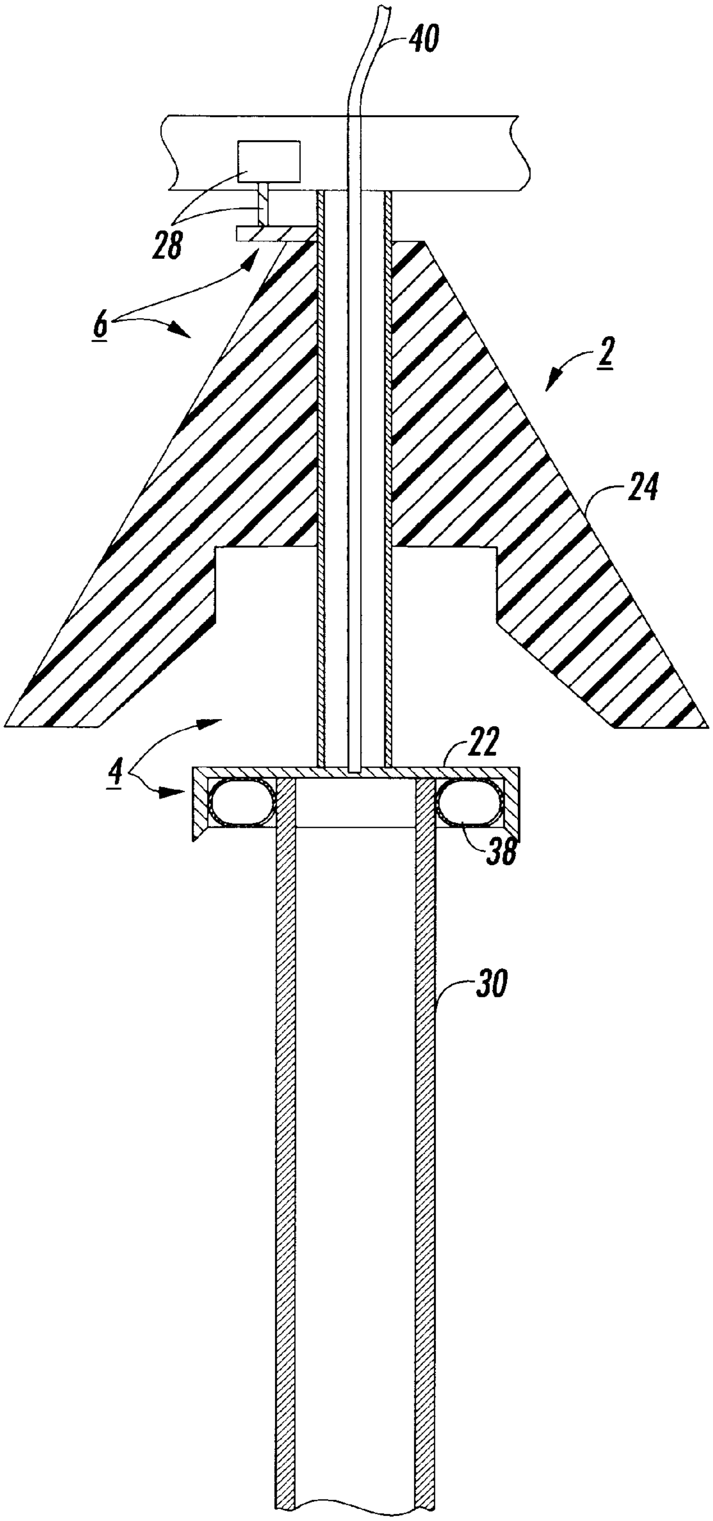
FIG. 8 shows a simplified, elevational, cross-sectional view of the embodiment of FIG. 7 holding a centered substrate where the alignment member is in the raised position.

FIGS. 7 and 8 illustrate another version of the present invention where the substrate holding assembly 4 grips the exterior surface of the substrate 30 using an expandable bladder 38 (shown in FIG. 7 as deflated; shown in FIG. 8 as inflated). Inflatable devices for gripping the exterior surface of a substrate are available from Firestone Industrial Products Company. Mechanical exterior holding devices can also be utilized. The bladder 38 is operatively coupled to a fluid supply line 40 which receives air from an air pump (not shown). Operation of the embodiment depicted in FIGS. 7 and 8 proceeds in a manner similar to that discussed for the other embodiments of FIGS. 1–6.

In embodiments, the substrate centering and holding apparatus 2 can pick up and then hold a substrate at one end, with the other end of the substrate being unsupported.

Any suitable rigid or flexible substrate having for example a drum or belt configuration may be held by the present centering and holding apparatus. The substrate may have a cylindrical cross-sectional shape or a noncylindrical cross-sectional shape such as an oval shape. The substrate may be solid, partially hollow, or entirely hollow, with one or both ends being open. The present invention is effective with substrates of any size, particularly smaller substrates ranging for example from about 5 to about 30 mm (outer diameter). The term substrate encompasses all objects that can be handled by the present invention, and is not limited to those objects whose surfaces are being treated by for example dip coating or plating.

The substrate is processed while the substrate holding assembly grips the substrate interior surface, substrate exterior surface, or both. Gripping of the substrate may occur at an interior or exterior region at the top half of the substrate, more preferably adjacent an open end of the substrate, or even at the bottom half of the substrate. Such processing includes for example depositing a layer of a coating composition on the substrate outer surface such as by dip coating, cleaning or lubricating of a substrate, and plating or electrodepositing a material on the substrate. Dip coating of various coating compositions to fabricate a photoreceptor known and is described for example in Petropoulos et al., U.S. Pat. No. 5,578,410, the disclosure of which is totally incorporated by reference. Suitable coating compositions include a charge generating composition and a charge transport composition.

Other modifications of the present invention may occur to those skilled in the art based upon a reading of the present disclosure and these modifications are intended to be included within the scope of the present invention.

I claim:

1. An apparatus for centering and holding a substrate comprising:

(a) a substrate holding assembly defining a centerline; and (b) a substrate centering assembly including an alignment member, wherein the alignment member is disposed concentric with the centerline and has an inclined surface that is inclined in a direction such that upon sliding contact of the substrate with the inclined surface, the substrate moves toward the centerline, and wherein the alignment member is movable along the centerline.

2. The apparatus of claim 1, wherein the alignment member is in the shape of a cone.

3. The apparatus of claim 1, wherein the alignment member is in the shape of a plurality of fingers.

4. The apparatus of claim 1, wherein the substrate holding assembly includes an expandable bladder.

5. The apparatus of claim 1, wherein the substrate is hollow and has an open end, and wherein the substrate holding assembly includes a section having a changeable width, wherein the width of the section is changeable to insert the section into the substrate interior, to contact the section with the substrate interior surface, and to remove the section from the substrate interior.

6. The apparatus of claim 5, wherein the section includes an expandable disk.

7. The apparatus of claim 5, wherein the contact of the section with the substrate interior surface creates a hermetic seal.

8. A handling method for a substrate wherein the substrate is off-center from a centered position, comprising:

(a) contacting the substrate with an inclined surface that is inclined towards the centered position and sliding the substrate along the inclined surface until the substrate is in the centered position;

(b) gripping the substrate to hold the substrate;

(c) processing the substrate while gripping the substrate; and (d) retracting the inclined surface away from contact with the substrate prior to the processing of the substrate.

9. The method of claim 8, wherein the processing of the substrate is accomplished by depositing a layer of a coating composition on the substrate outer surface.

10. The method of claim 8, wherein the gripping of the substrate creates a hermetic seal.

11. The method of claim 8, wherein the substrate is a cylinder.

* * * * *